US012602066B1

(12) United States Patent

Enright Senior

(10) Patent No.: US 12,602,066 B1

(45) Date of Patent: Apr. 14, 2026

(54) NON-PERMISSIVE FIRE CONNECTION SYSTEM

(71) Applicant: Patrick Emmit Enright Senior, Mantua, NJ (US)

(72) Inventor: Patrick Emmit Enright Senior, Mantua, NJ (US)

( * ) Notice: Subject to any disclaimer, the term of this patent is extended or adjusted under 35 U.S.C. 154(b) by 0 days.

(21) Appl. No.: 19/362,329

(22) Filed: Oct. 17, 2025

(51) Int. Cl.
 G05D 7/06 (2006.01)

(52) U.S. Cl.
 CPC .................................. G05D 7/0635 (2013.01)

(58) Field of Classification Search
 CPC .................................................... G05D 7/0635
 See application file for complete search history.

(56) References Cited

U.S. PATENT DOCUMENTS 6,076,278 A * 6/2000 Bradley .................. B08B 17/00
                                                              507/90
9,540,907 B1 * 1/2017 du Plessis ................ A62C 3/06
2004/0020663 A1 * 2/2004 Jackson ................. A62C 35/68
                                                              169/20
2011/0094758 A1 * 4/2011 Burkhart ............... A62C 35/64
                                                              169/17
2020/0101336 A1 * 4/2020 Bodemann ............. A62C 35/68
2021/0017044 A1 * 1/2021 Lolling .................. C02F 1/048
2021/0268322 A1 * 9/2021 Thomas ................. A62C 35/68

* cited by examiner

*Primary Examiner* — Patrick C Williams

(74) *Attorney, Agent, or Firm* — Ashok Tankha

(57) ABSTRACT

A system and method for preventing a hydrocarbon fuel from being pumped through a fire department connection line (FDCL) of a building into a riser line and a sprinkler system of the building (SSoB) is disclosed. The method employs a non-permissive fire connection system (NPFCS) installed in-line with the FDCL, within the building. The NPFCS includes a hydrocarbon detection sensor (HDS), an electronic shut-off valve (ESV), an ESV activation logic circuit, and a fail-safe logic circuit. The HDS is calibrated to detect a hydrocarbon in a liquid being pumped into the FDCL. When the liquid is the hydrocarbon fuel, a hydrocarbon is detected by the HIDS in the hydrocarbon fuel being pumped into the FDCL. When the hydrocarbon is detected by the HDS, the ESV activation logic circuit closes the ESV and shuts off the flow of the hydrocarbon fuel into the riser line and the SSoB.

13 Claims, 10 Drawing Sheets

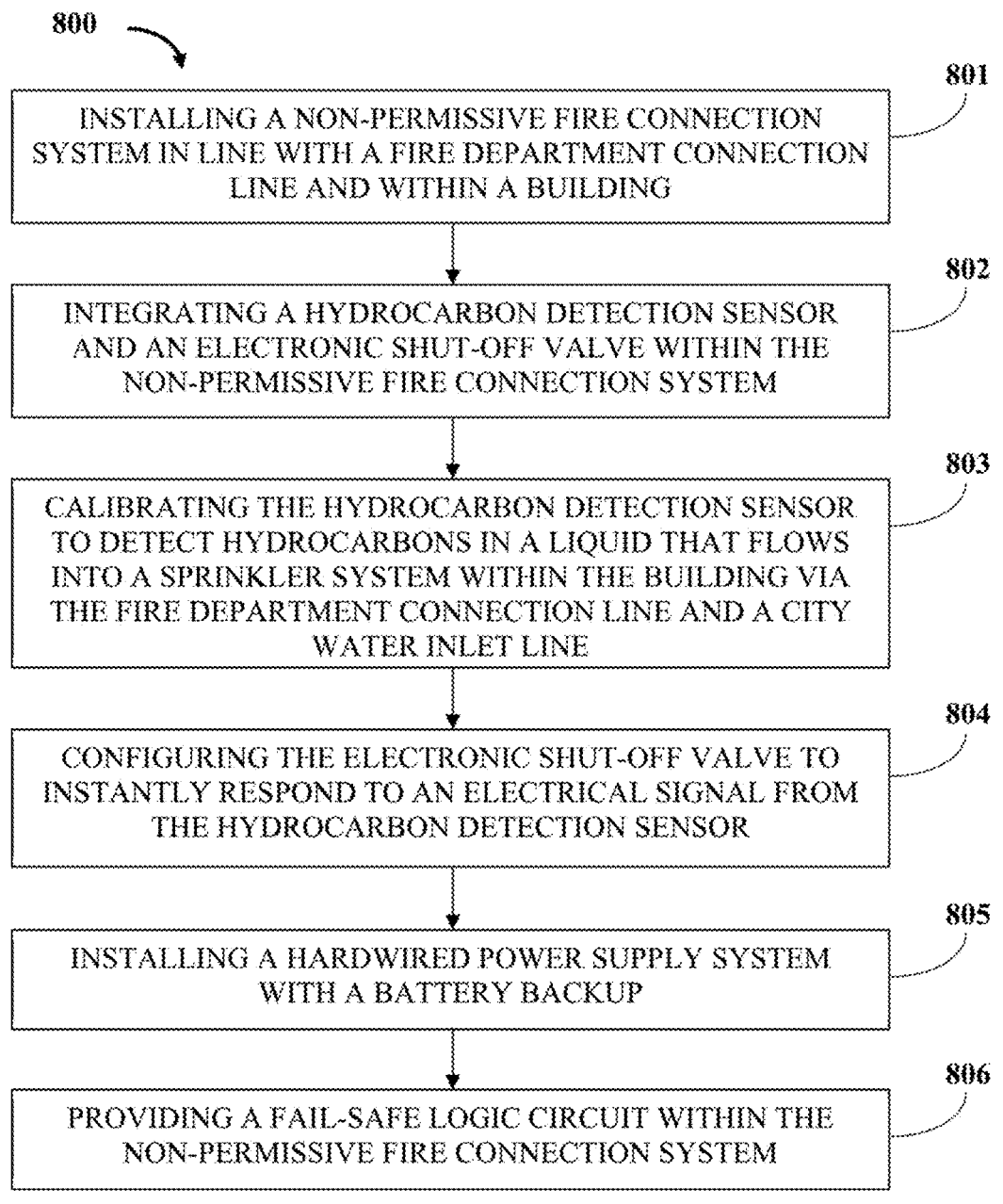

800

801
INSTALLING A NON-PERMISSIVE FIRE CONNECTION SYSTEM IN LINE WITH A FIRE DEPARTMENT CONNECTION LINE AND WITHIN A BUILDING

802
INTEGRATING A HYDROCARBON DETECTION SENSOR AND AN ELECTRONIC SHUT-OFF VALVE WITHIN THE NON-PERMISSIVE FIRE CONNECTION SYSTEM

803
CALIBRATING THE HYDROCARBON DETECTION SENSOR TO DETECT HYDROCARBONS IN A LIQUID THAT FLOWS INTO A SPRINKLER SYSTEM WITHIN THE BUILDING VIA THE FIRE DEPARTMENT CONNECTION LINE AND A CITY WATER INLET LINE

804
CONFIGURING THE ELECTRONIC SHUT-OFF VALVE TO INSTANTLY RESPOND TO AN ELECTRICAL SIGNAL FROM THE HYDROCARBON DETECTION SENSOR

805
INSTALLING A HARDWIRED POWER SUPPLY SYSTEM WITH A BATTERY BACKUP

806
PROVIDING A FAIL-SAFE LOGIC CIRCUIT WITHIN THE NON-PERMISSIVE FIRE CONNECTION SYSTEM

FIG. 8

NON-PERMISSIVE FIRE CONNECTION SYSTEM

BACKGROUND

Disclosed herein is a system and method for preemptively thwarting a terrorist from discharging a flammable, hydrocarbon based fuel, hereinafter a hydrocarbon fuel, for example, gasoline, fuel oil, diesel, kerosene, petroleum products, etc. from a fuel truck through a building's fire department connection (FDC) line into the building, and thereafter igniting the hydrocarbon fuel within the building, resulting in an implosion of the building and loss of life of the occupants within the building. A hydrocarbon fuel comprises hydrocarbon compounds, hereinafter a hydrocarbon. The implosion of the World Trade Center towers on Sep. 11, 2011 is an example of the destruction and loss of life and property caused by a hydrocarbon fuel related fire within a building.

In conventional buildings, as shown in FIGS. 1 and 2, a fire department connection (FDC) 101 and a shut-off valve 101a is typically installed adjacent to and outside of the building 106. The water inlet line 102 from the fire department connection (FDC) 101 connects to the city water inlet line 105, which extends as a riser line 116 to various distribution and user points in the building 106, for example, to overhead showers 104 in the building 106. The fire department connection (FDC) 101 is configured and installed to be quickly and easily accessible to any person outside the building 106, for example, by the local fire department personnel for connecting a hose from the fire engine to the fire department connection 101, and thereafter for pumping water from the fire engine into the line 102 within the building 106 to supplement the city's water supply system to the building 106 flowing along the city water line 105 and the riser line 116, to provide a large amount of water to a sprinkler network 104 within the building 106 for fire-fighting. The riser line 116 is configured to allow water flow upwards from a lower point in the building 106 to a higher point in the building 106.

The fire department connection 101 is installed and designed to be easily accessible for pumping water from a fire engine into a building 106 in the event of a fire within the building 106, but this very accessibility creates a potential security vulnerability. Because the fire department connection 101 is accessible to a person outside the building 106 and is available for pumping water from a fire engine into a building 106, it may be exploited by a terrorist seeking to inflict mass casualty within the building 106. Specifically, a terrorist may connect a hose from a fuel truck loaded with a hydrocarbon fuel, to the fire department connection 101, and pump the hydrocarbon fuel from the fuel truck into the building 106 at a rate of approximately one gallon per second or more, through the fire department connection line 102 into the riser line 116 of the building 106 and thereafter to the interconnected sprinkler system 104, rapidly flooding the interior of the building 106 with the hydrocarbon fuel, and thereafter igniting the hydrocarbon fuel inside the building 106. A hydrocarbon fuel is pumped from a fuel truck at approximately 100 psig, which is significantly higher than the standard 18 psig water pressure in the city water line and the connecting water line 105 and sprinkler system 104 within the building 106. This substantial pressure differential will allow a terrorist to pump a large volume of the hydrocarbon fuel into the building 106 through the fire department connection line 102, effectively turning the riser line 116 in the building 106 into a delivery mechanism for delivery of the hydrocarbon fuel to within the building 106. Hence, there is a long felt need for a system and a method to prevent a hydrocarbon fuel from being pumped by a terrorist through the fire department connection line 102 into the riser line 116 and the connecting sprinkler system 104 of a building 106.

BRIEF DESCRIPTION OF THE DRAWINGS

The foregoing summary, as well as the following detailed description of the invention, is better understood when read in conjunction with the appended drawings. For illustrating the embodiments herein, exemplary constructions of the embodiments are shown in the drawings. However, the embodiments herein are not limited to the specific methods and components disclosed herein. The description of a method step or a component referenced by a numeral in a drawing is applicable to the description of that method step or that component shown by that same numeral in any subsequent drawing herein.

FIG. 8 illustrates a flowchart of an embodiment of a method for preventing a hydrocarbon fuel from being pumped through a fire department connection line of a building, into a riser line and a sprinkler system of the building.

DETAILED DESCRIPTION OF THE INVENTION

Figure 1:
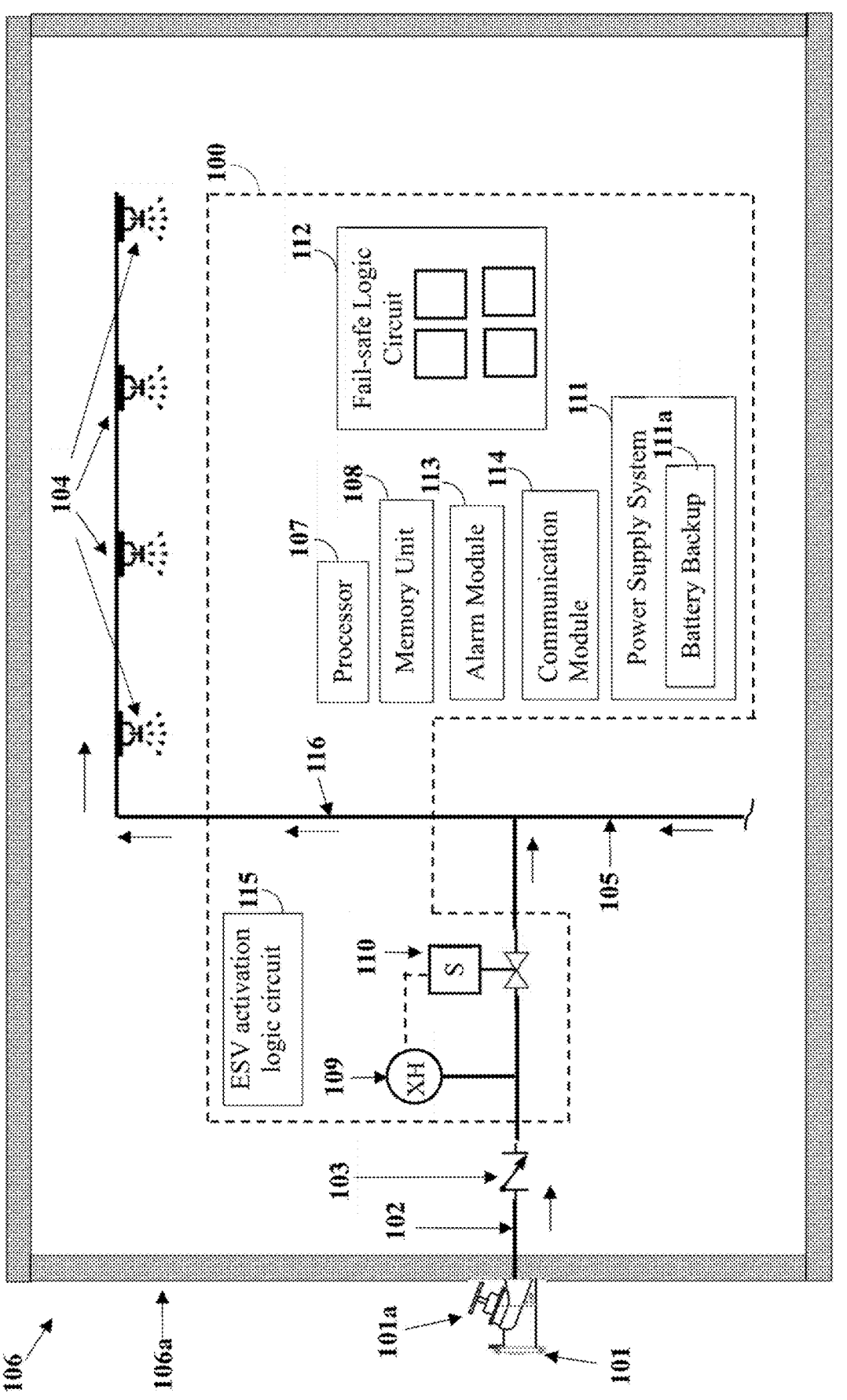
FIG. 1 exemplarily illustrates a non-permissive fire connection system operably installed in-line with a fire department connection line.

FIG. 1 exemplarily illustrates a non-permissive fire connection system (NPFCS) 100 operably installed in-line with a fire department connection (FDC) line 102 of a building 106. A fuel truck loaded with hydrocarbon fuel can discharge the hydrocarbon fuel from the fuel truck via a hose connected from the fuel truck to the quick connect connection 101, schematically represented by the vertical line 101, into the fire department connection line 102, and thereafter into the riser line 116 and the sprinkler system 104. The non-permissive fire connection system 100 is disposed within the interior of the building 106 to prevent unauthorized access and tampering of the non-permissive fire connection system 100 by a person outside the building 106. The non-permissive fire connection system 100 prevents entry of the hydrocarbon fuel into the building 106 through the fire department connection line 102, and into the riser line 116 and the sprinkler system 104. In normal use, the fire department connection line 102, the city water inlet line 105, the riser line 116, and the sprinkler system 104 are configured to supply water to other users connected to the riser line 116 and the sprinklers 104 to extinguish a fire within the building 106. The fire department connection line 102 extends laterally from an exterior wall 106*a* of the building 106 to the city water inlet line 105 inside the building 106.

As illustrated in FIG. 1, the fire department connection (FDC) line 102 is connected to the building's 106 city water inlet line 105 via a check valve 103. In an embodiment, there may be multiple check valves 103 on the fire department connection line 102, to prevent backflow of water from the building's 106 city water inlet line 105 and the sprinkler system 104 into the hose from the fire engine. The city water inlet line 105 supplies city water to the building's 106 sprinkler system 104 and other users connected to the riser line 116 and the sprinkler system 104. During normal operation, city water is supplied to the building 106 through the city water inlet line 105, which extends to the riser line 116 and thereafter to users connected to the riser line 116 and to the sprinkler system 104. In the event of a fire within the building 106 and/or in the vicinity of the building 106, firefighting personnel connect a hose from the fire engine to the quick connect fitting 101 and pump water from the fire engine through line 102 to augment the water flow in the city water line 105 and the riser line 116 to the sprinkler system 104. This increases both the volume and pressure of water in the riser line 116 that is supplied to the fire suppression system, i.e., the sprinkler system 104, thereby enhancing the effectiveness and speed of fire extinguishment in building 106. The fire department connection line 102 may have a diameter, for example. of about 1 inch to about 6 inches. A fire engine can pump water at a pressure from about 100 psig to about 200 psig. The flow rate of the liquid pumped from the fire engine may vary based on the diameter of the fire department connection line 102, with the fire truck capable of pumping water at rates between about 500 and about 2000 gallons per minute. In an embodiment, the fire department connection line 102 may be configured as a freestanding pipe positioned near the sidewalk or curb adjacent to the building 106, and extending up to the water inlet line 105 inside the building. Regardless of the specific configuration, the quick-connect fitting 101 of the fire department connection line 102 is located on the external surface of the wall 106*a* of the building 106 to ensure quick access by emergency personnel to the fire department connection line 102.

As exemplarily illustrated in FIG. 1, the non-permissive fire connection system (NPFCS) 100 is a tamper-proof, instrument-controlled valve system, and is operably installed in line with the fire department connection (FDC) line 102, inside the building 106. The non-permissive fire connection system NPFCS 100 is positioned within the building 106 to prevent an unauthorized person from accessing the NPFCS 100 from outside the building, and thereafter tampering with it.

FIG. 1 exemplarily illustrates the non-permissive fire connection system (NPFCS) 100 which comprises a processor 107, a memory unit 108, a hydrocarbon detection sensor

109, an electronic shut-off valve 110, a hardwired power supply system 111 with a battery backup 111*a*, a fail-safe logic circuit 112, an alarm module 113, a communication module 114, and an electronic shut-off valve (ESV) activation logic circuit 115. The non-permissive fire connection system 100 is enclosed within a robust casing designed to ensure the integrity and safe operation of the non-permissive fire connection system 100 to preclude external tampering and unauthorized access to the NPFCS 100, and environmental exposure. The processor 107 is configured to control the operation of the non-permissive fire connection system 100. A hydrocarbon fuel comprises hydrocarbon compounds, hereinafter a hydrocarbon. The hydrocarbon detection sensor 109 is operatively coupled to the processor 107 and functions continuously to detect a hydrocarbon in the liquid that flows in line 102. The hydrocarbon detection sensor 109 is installed in-line with the fire department connection (FDC) line 102. Detection of a hydrocarbon in the liquid flowing through line 102 by the hydrocarbon detection sensor 109 indicates the presence of a hydrocarbon fuel in line 102. The electronic shut-off valve 110 is located downstream of the hydrocarbon detection sensor 109. In an embodiment, the non-permissive fire connection system 100 comprises multiple hydrocarbon detection sensors 109. The hydrocarbon detection sensor 109 is calibrated to detect a hydrocarbon in a liquid that flows along line 102 and then into the sprinkler system 104 via the riser line 116 in building 106. The hydrocarbon detection sensor 109 is configured to record any hydrocarbon sensed in a liquid flowing in line 102 in real time, and communicates the data to the processor 107 for analysis. When a hose from a fire engine or a pressurized pump is connected to the fire department connection line 102 and pumps a hydrocarbon fuel through line 102 and line 116 into the sprinkler system 104 in the building 106, the hydrocarbon detection sensor 109 checks the incoming liquid flowing along line 102 and detects the presence of the hydrocarbon in the liquid flowing along line 102. Detection of a hydrocarbon by the hydrocarbon detection sensor 109 in the liquid flowing along line 102, indicates the presence of the hydrocarbon fuel flowing through line 102.

The hydrocarbon detection sensor 109 is configured to detect changes in one or more physical or chemical properties of the liquid flowing into line 102, such as conductivity, capacitance, infrared absorption, hydrocarbon vapor concentration, etc. The hydrocarbon detection sensor 109 converts the detected changes into an electrical signal and transmits the signal to a processor 107 for monitoring and further processing. In an embodiment, the hydrocarbon detection sensor 109 is configured to also transmit the electrical signal to a relay (XR) 702, shown in FIG. 7, which is connected to the electronic shut-off valve 110. In an embodiment, the hydrocarbon detection sensor 109 is an infrared (IR) sensor configured to detect hydrocarbon-specific absorption patterns in the liquid flowing along line 102. In another embodiment, the hydrocarbon detection sensor 109 is a semiconductor gas sensor configured to respond to volatile organic compounds (VOCs) present in a fluid flowing along line 102. In another embodiment, the hydrocarbon detection sensor 109 is a capacitive or resistive sensor configured to detect changes in dielectric or resistive properties when a hydrocarbon is detected by the hydrocarbon detection sensor 109 in the liquid flowing along line 102. In another embodiment, the hydrocarbon detection sensor 109 is a fiber-optic sensor configured to detect light attenuation or scattering if a hydrocarbon is detected in the fluid flowing along line 102.

In another embodiment, the hydrocarbon detection sensor 109 is a multi-modal hydrocarbon fuel sensor that integrates fiber-optic sensing, mid-infrared spectroscopy, and surface acoustic wave (SAW) detection within a single probe for real-time identification and differentiation of hydrocarbon-based compounds in the liquid flowing along line 102. The multi-modal hydrocarbon detection sensor 109 is configured to detect changes in optical absorption, acoustic resonance, and chemical vapor signatures, and transmits the combined signals to the processor 107 comprising a machine learning engine trained to identify various hydrocarbons in hydrocarbon fuels such as, gasoline, diesel, kerosene, crude oil, and biofuels flowing along line 102. The integration of multiple sensing modalities with intelligent signal interpretation enables precise hydrocarbon fingerprinting and reduces false positives.

In another embodiment, the hydrocarbon detection sensor 109 operates using UV-fluorescence, wherein a UV LED light source at a wavelength of approximately 365 nm excites hydrocarbon molecules present in the liquid flowing along line 102. The resulting fluorescent emission is then detected at specific wavelengths (e.g., 410 nm and 470 nm), allowing the system to measure the concentration of hydrocarbons in the fire-fighting fluid in parts per million (ppm). When flammable hydrocarbons are detected in the liquid flowing along line 102, the hydrocarbon detection sensor 109 transmits an electrical signal to the processor 107 for monitoring and further processing.

The electronic shut-off valve 110 is configured to instantly respond to the electrical signal from the hydrocarbon detection sensor 109 and close the shut-off valve 110 when the hydrocarbon detection sensor 109 detects a hydrocarbon in the liquid flowing along line 102. In an embodiment, the electronic shut-off valve 110 is a smart electro-pneumatic valve that combines piezoelectric actuation with microfluidic flow control and integrated sensors for real-time pressure and leak detection, eliminating the need for high inrush currents typical of solenoids and enabling silent, ultra-low-power operation suitable for battery-powered or IoT-enabled systems. In another embodiment, the electronic shut-off valve 110 is a solenoid valve. Upon detection of a hydrocarbon in the liquid flowing in line 105 by the hydrocarbon detection sensor 109, a signal is transmitted to the processor 107. In response to receipt of the signal, the processor 107 closes the electronic shut-off valve 110, thereby shutting down the flow of the liquid flowing along the line 102 and preventing the hydrocarbon fuel from entering the riser line 116, users on the riser line and the sprinkler system 104. If the liquid flowing along the line 102 is not contaminated with a hydrocarbon fuel, the hydrocarbon detection sensor 109 transmits an electrical signal to the processor 107 to keep the electronic shut-off valve 110 open and allow the liquid flowing along the line 102 to enter the riser line 116 and to the downstream users off line 116 and the sprinkler system 104.

The hardwired power supply system 111 enables the non-permissive fire connection system (NPFCS) 100 to connect directly to a power grid of the building 106. In an event of power loss, the built-in battery backup 111a ensures that the NPFCS 100 remains operational. The built-in battery backup 111a provides back-up power supply in the event the hardwired power supply powering the NPFCS 100 is tampered with, disconnected or disabled by an unauthorized person. Upon detection of one or more of external tampering or presence of a hydrocarbon fuel in line 102, the processor 107 on the NPFCS 100 transmits an alarm via an alarm module 113 to a remote monitoring facility via the communication module 114, and also activates an audible and/or visual alarm, to alert building 106 personnel and emergency responders of an attempted breach.

Figure 9:
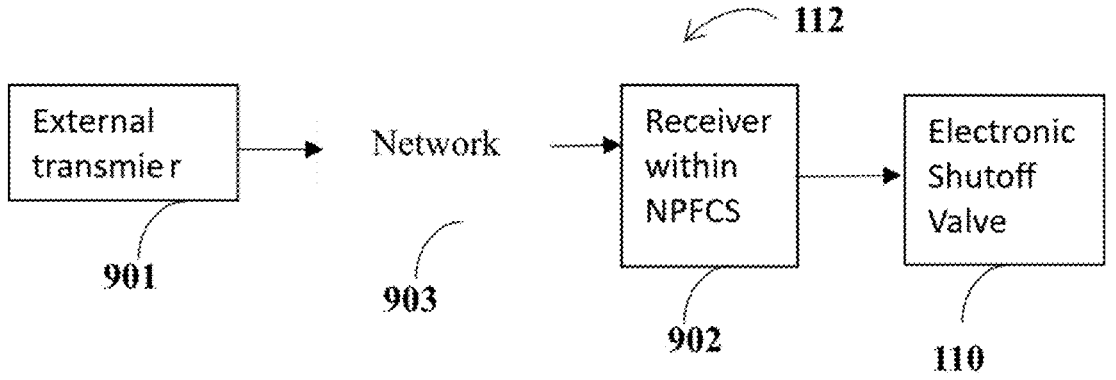
FIG. 9 exemplarily illustrates an embodiment of a block diagram of a fail-safe circuit for the non-permissive fire connection system.

The fail-safe logic circuit 112 is one of a redundant circuit logic, a watchdog timer, a self-checking circuit, a diagnostic loop, fail-silent, a fail-operational, etc. In an embodiment the fail-safe logic circuit 112 detects one or more of an error state or an error condition or a compromised condition of the non-permissive fire connection system (NPFCS) and closes the electronic shut-off valve 110. For example, an error state occurs, or an error condition occurs when one or more of the hydrocarbon detection sensor 109 and the electronic shut-off valve 110 or any other internal component of the NPFCS fails. For example, a compromised condition occurs in an event of a power failure of both the hard-wired power supply 111 as well as the battery backup power supply 111a to the NPFCS. Under such condition, the fail-safe logic circuit 112 is configured to default the electronic shut-off valve 110 to a closed position, thereby shutting off the liquid flow in the fire department connection line 102 to the building 106. The fail-safe logic circuit 112 comprises an external transmitter 901 located outside the NPFCS 100, as shown in FIG. 9, configured to continuously transmit a "valve open signal" to a receiver 902 within the NPFCS 100 via the network 903. In the event of an error state, or an error condition, or a compromised condition of the non-permissive fire connection system (NPFCS) 100, the receiver 902 ceases to receive the "valve open signal" from the external transmitter 901. Absence of this signal causes the electronic shut-off valve 110 to default to the closed position.

When a hydrocarbon is not detected in the FDC line 102, the hydrocarbon detection sensor 109 transmits a "valve open signal" to the electronic shut-off valve 110. Upon detection of a hydrocarbon in the liquid pumped from outside the building 106 into the building 106 along line 102, the hydrocarbon detection sensor 109 transmits a "valve close signal" to the electronic shut-off valve 110, thereby shutting off the hydrocarbon fuel from being pumped from a fuel truck or other apparatus into the building 106 through the quick disconnect fitting 101 along line 102.

Figure 2:
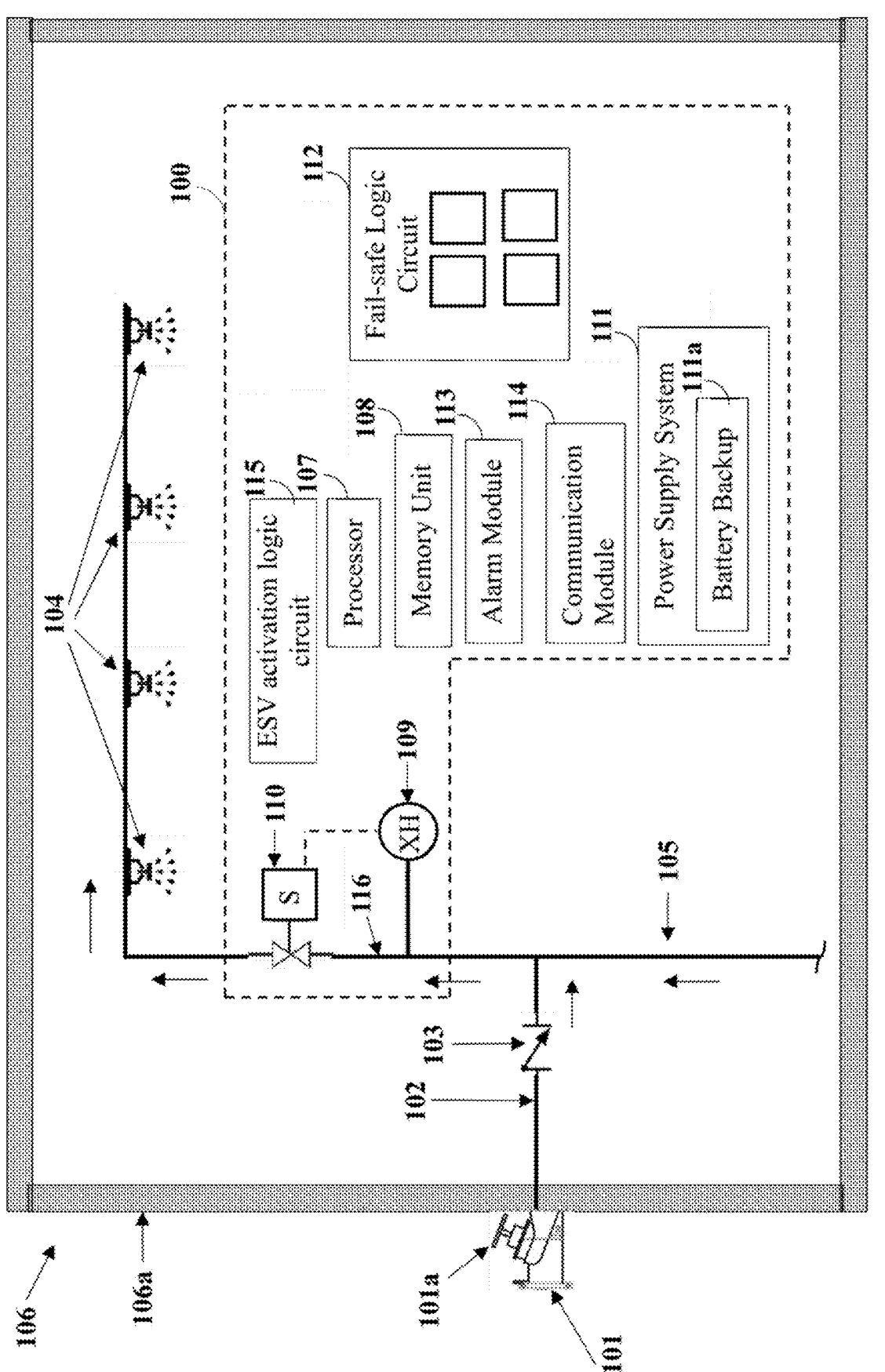
FIG. 2 exemplarily illustrates a non-permissive fire connection system operably coupled to the riser line of the building at a location downstream of the junction where the fire department connection line connects to the water inlet line.

FIG. 2 exemplarily illustrates a non-permissive fire connection system NPFCS 100 operably coupled to the riser line 116 of the building 106 at a location downstream of the junction where the fire department connection (FDC) line 102 connects to the water inlet line 105. In an embodiment, the NPFCS 100 is operably connected in-line with the water inlet line 105 in the building 106. In another embodiment, one unit each of the NPFCS 100 is operably installed in line with the FDC line 102 and the water inlet line 105 in the building 106.

Figure 3:
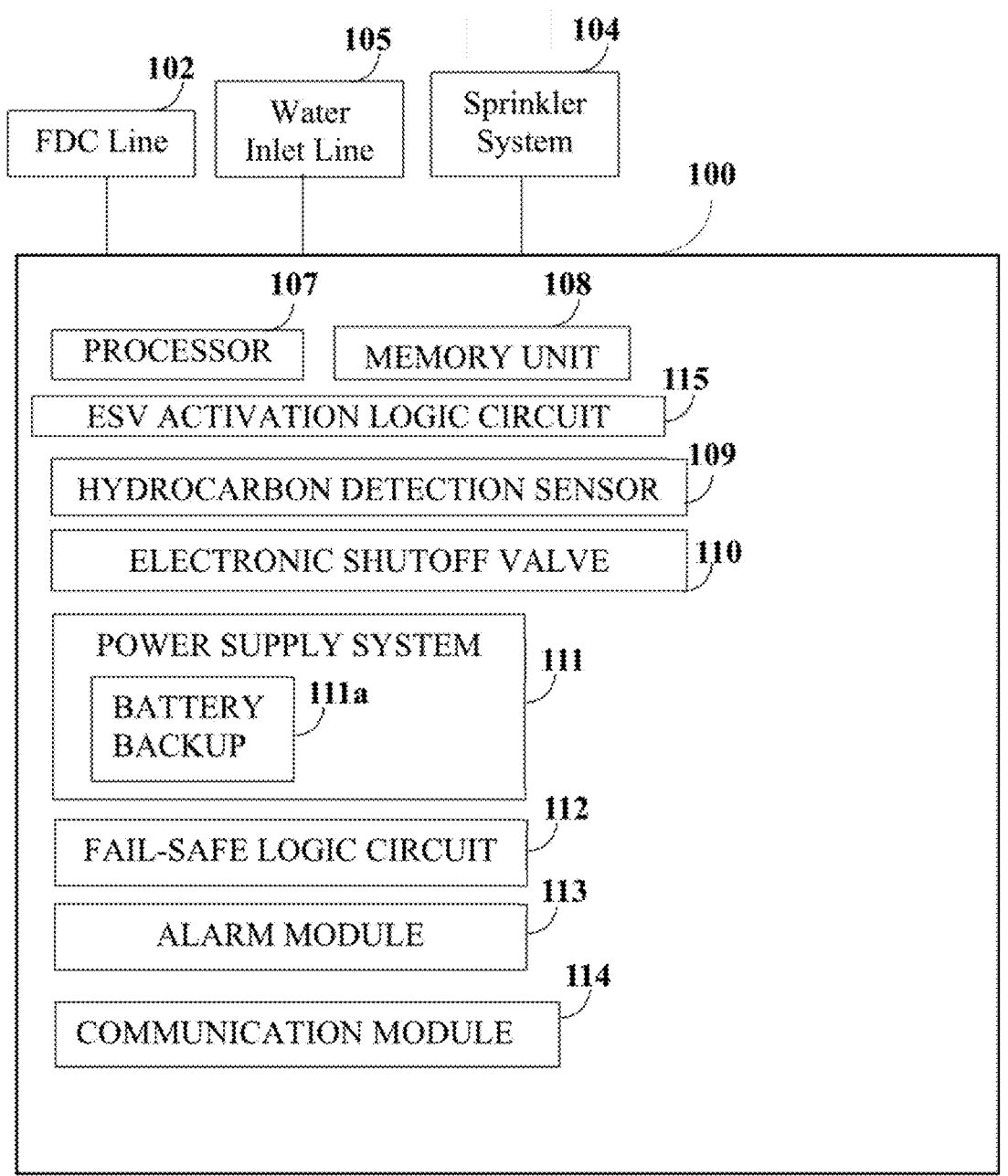
FIG. 3 exemplarily illustrates a block diagram of a non-permissive fire connection system.

FIG. 3 exemplarily illustrates a block diagram of a non-permissive fire connection system (NPFCS) 100. The processor 107 is one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. The memory unit 108 is a storage unit for recording, storing, and reproducing data, program instructions, and applications. The processor 107 is operably and communicatively coupled to the memory unit 108, which stores instructions configured to control the operation of the NPFCS 100. The processor 107 is configured to manage a plurality of operations associated with the functioning of the NPFCS 100, comprising receiving a signal from the hydrocarbon detection sensor 109; analyzing the signal to identify a hydrocarbon(s) in the liquid pumped through the quick connect connection 101 and thereafter through the fire department connection line 102, generating and transmitting control instructions to the electronic shut-off valve 110 based on detection of a hydrocarbon(s) in the liquid flowing in the fire department connection line 102; initiating communication of an alarm signal under predefined conditions; and detecting potential or unauthorized tampering of the NPFCS 100.

Figure 4:
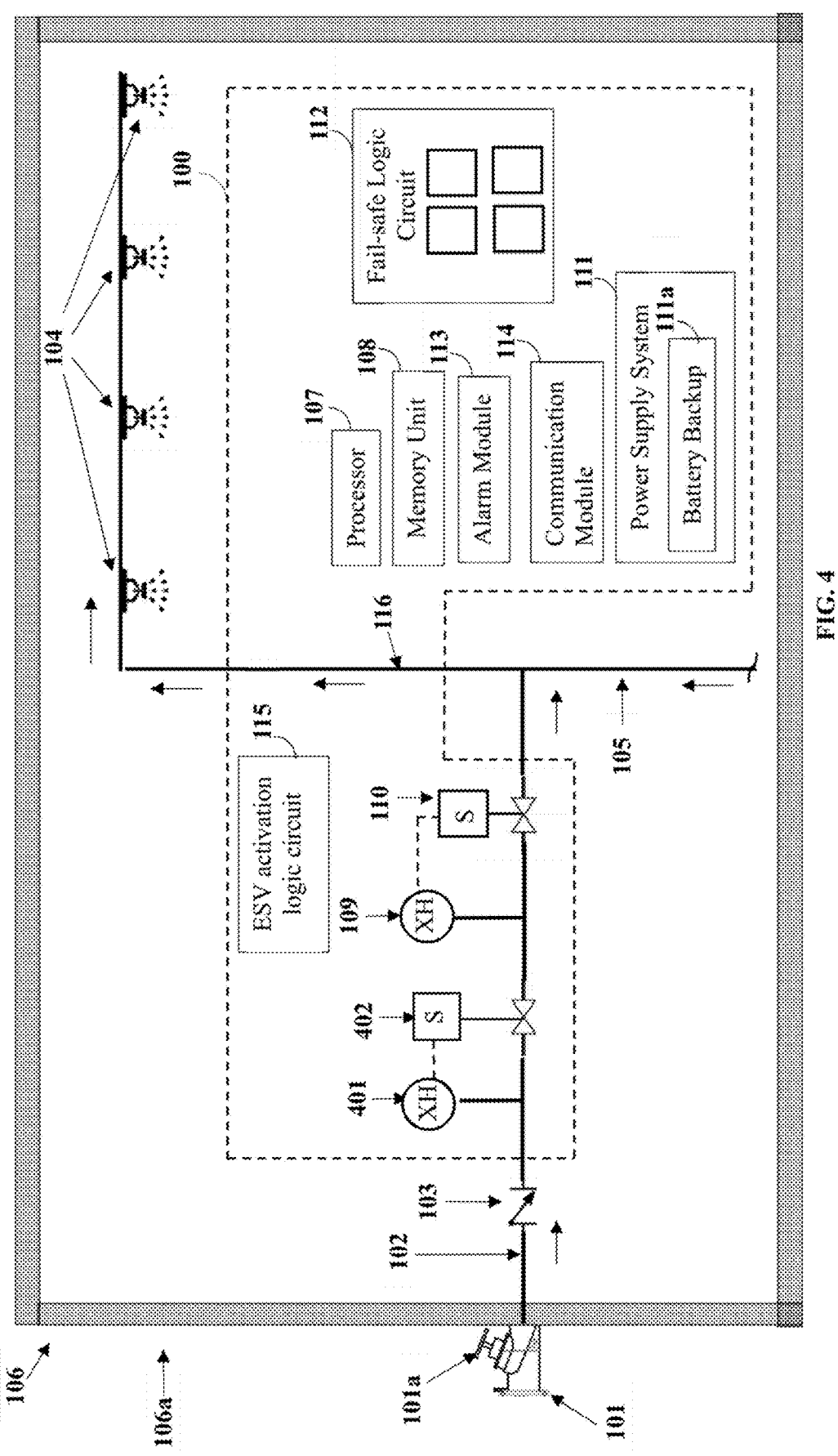
FIG. 4 exemplarily illustrates an embodiment of the non-permissive fire connection system operably installed in-line with a fire department connection line.

FIG. 4 exemplarily illustrates an embodiment of the non-permissive fire connection system operably installed in-line with a fire department connection line 102. In this embodiment, the non-permissive fire connection system (NPFCS) 100 comprises a sensor assembly 401 configured to detect a hydrocarbon(s) in a hydrocarbon fuel introduced into the fire department connection (FDC) line 102. The sensor assembly 401 and a first electronic shut-off valve 402 are installed upstream of the hydrocarbon detection sensor 109 and the second electronic shut-off valve 110. The liquid entering the FDC line 102 passes through the hydrocarbon detection sensor assembly 401 and the first electronic shut-off valve 402, before reaching the hydrocarbon detection sensor 109. The sensor assembly 401 comprises a pressure sensor (not shown), a density sensor (not shown), and a viscosity sensor (not shown). The pressure sensor in the sensor assembly 401 measures the real-time pressure of the incoming liquid flowing along line 102. The density sensor, for example, a Coriolis-type mass flow meter in the sensor assembly 401 measures the incoming liquid's density by measuring mass flow characteristics. The viscosity sensor, for example, a vibrational or tuning fork-type viscometer in the sensor assembly 401, measures the incoming liquid's resistance to flow. Each sensor is rated for operation under elevated pressure conditions and is suitable for use with both water and hydrocarbon fuels. The sensor assembly 401 continuously monitors the physical properties of the liquid flowing in the FDC line 102. If the measured density falls below a predefined threshold, for example, less than 950 $kg/m^3$, or if the measured viscosity exceeds the range for water, for example, greater than 1.5 centipoise, or if the pressure exceeds the range for water, for example, greater than 45-75 pounds per square inch gauge, the NPFCS 100 determines and alarms that the liquid flowing along the FDC line 102 may not be water. The data from all sensors is transmitted to the processor 107, which compares the measured values to stored reference parameters for water and for various types of hydrocarbon fuels. If the processor 107 identifies the liquid flowing along line FDC 102 is a hydrocarbon fuel, the processor 107 closes the first electronic shut-off valve 402 positioned downstream of the sensor assembly 401. In the shut-down state, the first electronic shut-off valve 402 prevents the hydrocarbon fuel flow further downstream along the FDC line 102. By integrating the first electronic shut-off valve 402 with the sensor 401 output, the NPFCS 100 not only detects but also shuts-off the flow of hydrocarbon fuel along the FDC line 102, thereby precluding the hydrocarbon fuel from entering line 116 and the users along line 116 and the sprinkler system 104. The NPFCS 100 operates in accordance with the functionalities and processes disclosed in the detailed description of FIGS. 1 and 2. The second electronic shut-off valve 110 is configured to instantly respond to an electrical signal from the hydrocarbon detection sensor 109, and closes valve 110 when the hydrocarbon detection sensor 109 detects a hydrocarbon(s) in the incoming liquid flowing along the fire department connection (FDC) line 102.

Figure 5A:
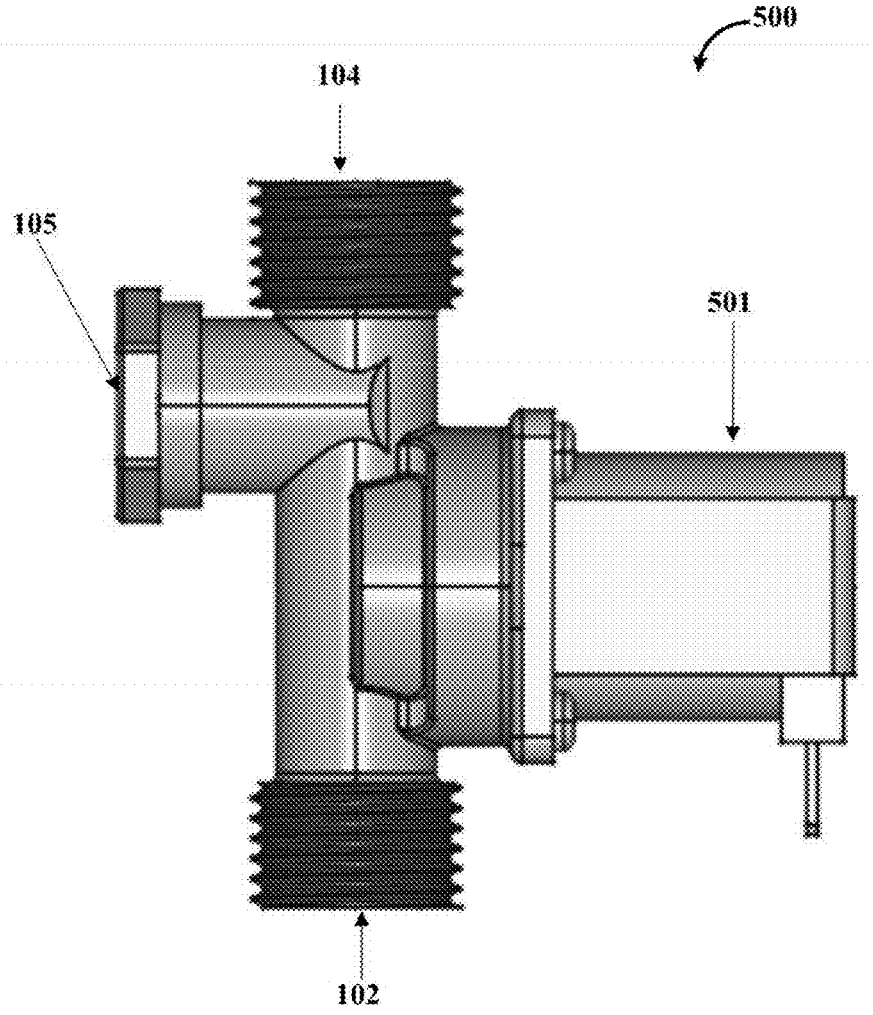
FIG. 5A exemplarily illustrates right side perspective view of an embodiment of a non-permissive fire connection system.
Figure 5B:
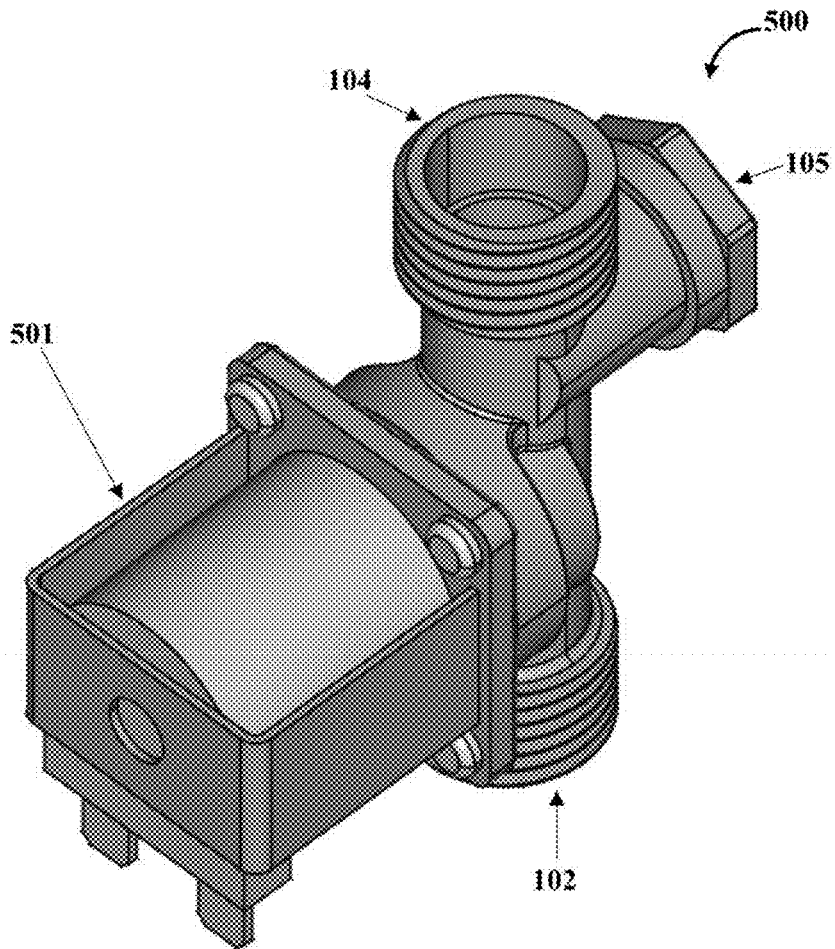
FIG. 5B exemplarily illustrates a front perspective view of the embodiment of the component of the non-permissive fire connection system shown in FIG. 5A.

FIG. 5A exemplarily illustrates right side perspective view of an embodiment of a component of the non-permissive fire connection system (NPFCS) 500. FIG. 5B exemplarily illustrates a front perspective view of the embodiment of the component of the non-permissive fire connection system (NPFCS) 500 shown in FIG. 5A. As shown in FIG. 5A, the non-permissive fire connection system (NPFCS) 500 comprises a water inlet line 102 from a fire department connection (FDC) 101 shown in FIG. 1, a city water inlet line 105, an outlet 104 in communication with line 116 and the downstream sprinkler system 104. The non-permissive fire connection system (NPFCS) 500 is encased in a robust casing 501.

Figure 6:
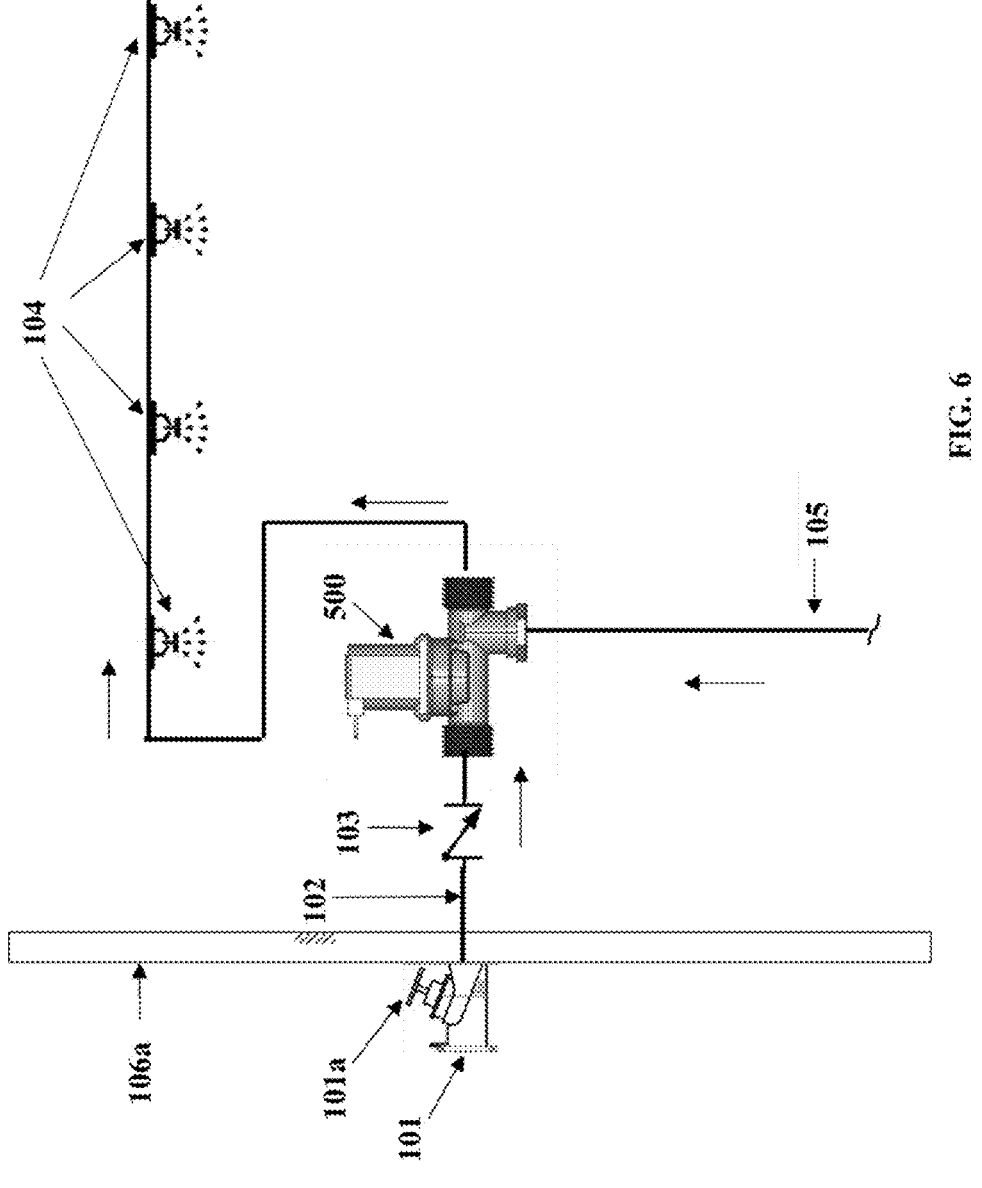
FIG. 6 exemplarily illustrates the embodiment of the non-permissive fire connection system operably installed in-line with a fire department connection line.

As exemplarily illustrated in FIG. 6, the NPFCS 500 is operably installed in-line with the fire department connection (FDC) line 102. The NPFCS 500 is positioned within the interior of a building to prevent access and tampering of the NPFCS 500 by an unauthorized person. The NPFCS 500 prevents the flow of a hydrocarbon fuel into the fire department connection (FDC) line 102, riser line 116, users off the riser line and the sprinkler system 104. The processor 107, the memory unit 108, the hydrocarbon detection sensor 109, the electronic shut-off valve 110, the hardwired power supply system 111 with a built-in battery backup 111a, the fail-safe logic circuit 112, the alarm module 113, and the communication module 114 of the NPFCS 500 are enclosed within a robust casing 501 designed to ensure the integrity and safe operation of the NPFCS 500 by precluding unauthorized access, external tampering, and environmental exposure. The NPFCS 500 operates in accordance with the functionalities and processes disclosed in the detail description of FIGS. 1 and 2.

Figure 7:
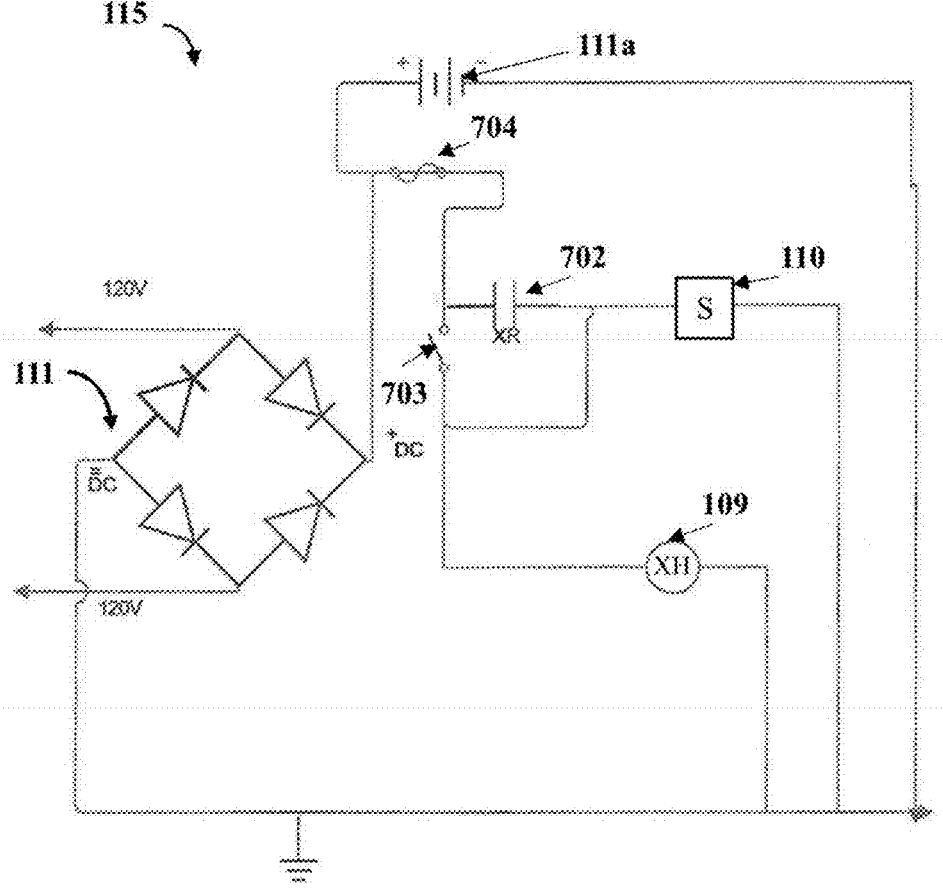
FIG. 7 exemplarily illustrates an embodiment of an electronic shut-off valve (ESV) activation logic circuit within a non-permissive fire connection system for opening and closing the electronic shut-off valve based on an electrical signal from the hydrocarbon detection sensor.

FIG. 7 exemplarily illustrates an embodiment of an electronic shut-off valve (ESV) activation logic circuit 115, shown in FIG. 1, within a non-permissive fire connection system (NPFCS) 100 for opening or closing the electronic shut-off valve 110 based on an electrical signal from the hydrocarbon detection sensor 109. FIG. 7 is a schematic electrical circuit showing the electrical connection between the hydrocarbon detection sensor 109, the electronic shut-off valve 110, and the relay XR 702. In operation, the hydrocarbon detection sensor 109 is configured to detect the presence of a hydrocarbon in the liquid that flows in the fire department connection line 102 to the water inlet line 105. When no hydrocarbon is detected in the fire department connection line 102, the hydrocarbon detection sensor XH 109 does not generate and does not send an electrical signal to the relay XR 702, precluding activation of the relay XR 702, thereby allowing the electronic shut-off valve 110 to remain open and allow the flow of water which is not contaminated with a hydrocarbon along line 102, into the riser line 116 and to the users off the riser line 116 and the sprinkler system 104. If a hydrocarbon is detected in the liquid flowing through line 102, XH 109 generates an electrical signal, energizing the relay XR 702, which in turn closes its contact to activate the valve closure mechanism to close the electronic shut-off valve 110, thereby stopping the flow of the hydrocarbon fuel into line 102, the riser line 116, users off the riser line 116 and the sprinkler system 104. In an embodiment, the electronic shut-off valve 110 is a solenoid valve. An optional over-ride switch 703 is provided to allow manual bypass of the relay (XR) 702 and the electronic shut-off valve 110 when necessary. A fuse 704 may be used to protect the circuit of the non-permissive fire connection system (NPFCS) 700 from electrical surges. A hardwired power supply system 111 connects directly to a power grid of the building 106 and supplies electrical power to the ESV activation logic circuit 115. A battery backup 111a is also provided and in the event of power loss, the built-in battery backup 111a ensures that the NPFSC 100 containing the ESV activation logic circuit 115 remains operational.

FIG. 8 illustrates a flowchart of an embodiment of a method 800 for preventing a hydrocarbon fuel from being pumped through a fire department connection line 102 of a building 106, into a riser line 116, users off the riser line 116 and a sprinkler system 104 in the building 106. As illustrated in FIG. 8, the method 800 employs a non-permissive fire connection system (NPFCS) 100. The method 800 comprises installing 801 the non-permissive fire connection system 100 in line with the fire department connection line 102, within the building 106. The non-permissive fire connection system 100 is a tamper-proof internal instrumentation and valve system installed inside the building 106. The non-permissive fire connection system 100 is not accessible to unauthorized persons and cannot be manipulated from outside the building 106.

The method 800 illustrated in FIG. 8 further comprises integrating 802 a hydrocarbon detection sensor 109 and an electronic shut-off valve 110 within the non-permissive fire connection system 100. The method 800 further comprises calibrating 803 the hydrocarbon detection sensor 109 to detect hydrocarbons in the liquid that flows via the fire department connection line 102 and the riser line 116, users off the riser line 116 and the sprinkler system 104 in the building 106. The method 800 further comprises configuring 804 the electronic shut-off valve 110 to instantly respond to an electrical signal from the hydrocarbon detection sensor 109 on detection of a hydrocarbon in the fire department connection line 102. The electronic shut-off valve 110 shuts off flow of the hydrocarbon liquid into the fire department connection line 102, the riser line 116, users of the riser line 116 and the sprinkler system 104, when the hydrocarbon detection sensor 109 detects a hydrocarbon(s) in the liquid pumped into the fire department connection line 102. The method 800 further comprises installing 805 a hardwired power supply system 111 with a battery backup 111a. The non-permissive fire connection system 100 connects directly to a power grid of the building. In an event of power loss, the built-in battery backup 111a ensures that the non-permissive fire connection system 100 remains operational.

As illustrated in FIG. 8, the method 800 further comprises providing 806 a fail-safe logic circuit 112 within the non-permissive fire connection system 100. The fail-safe logic circuit 112 detects one or more of an error condition of the non-permissive fire connection system 100 and defaults the electronic shut-off valve 110 to a closed state, thereby precluding the flow of the hydrocarbon fuel into the fire department connection line 102, the riser line 116, users off the riser line 116 and the sprinkler system 104.

FIG. 9 exemplarily illustrates a block diagram embodiment of a fail-safe circuit 112 for the non-permissive fire connection system 100. The fail-safe circuit 112 comprises an external transmitter 901 that continuously sends a valve open signal to a receiver 902 within the non-permissive fire connection system 100 over a wireless network 903. The external transmitter 901 may be placed at any convenient location in the building 106. In the event of an error state, or an error condition, or a compromised condition of the non-permissive fire connection system (NPFCS) 100, the receiver 902 ceases to receive the "valve open signal" from the external transmitter 901. Absence of this signal causes the electronic shut-off valve 110 to default to the closed position.

The electronic shutoff valve 110 is also configured to receives a valve open signal from the hydrocarbon detection sensor 109. The electronic shutoff valve 110 remains open only when both valve open signals are received. When either of the two signals are not received, the electronic shutoff valve 110 closes. When the hydrocarbon detection sensor 109 detects a hydrocarbon(s) in the FDC line 102, it sends a valve close signal to the electronic shutoff valve 110 and the electronic shutoff valve 110 closes.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A method for preventing a hydrocarbon fuel from being pumped through a fire department connection line of a building, into a riser line and a sprinkler system of the building, comprising:

installing a non-permissive fire connection system, in-line, with the fire department connection line within the building, wherein the non-permissive fire connection system is a tamper-proof internal instrumentation and valve system, and wherein the non-permissive fire connection system is not accessible from outside the building for manipulation;

integrating a hydrocarbon detection sensor and an electronic shut-off valve within the non-permissive fire connection system;

calibrating the hydrocarbon detection sensor to detect a hydrocarbon in the hydrocarbon fuel that flows via the fire department connection line and the riser line into the sprinkler system within the building;

configuring the electronic shut-off valve to instantly respond to an electrical signal from the hydrocarbon detection sensor, wherein the electronic shut-off valve shuts off flow of the hydrocarbon fuel into the riser line and the sprinkler system, when the hydrocarbon detection sensor generates an electrical signal upon detecting the hydrocarbon in the fire department connection line in the building, thereby precluding flow of the hydrocarbon fuel into the riser line and the sprinkler system of the building;

installing a hardwired power supply system with a battery backup in the non-permissive fire connection system, wherein the non-permissive fire connection system connects directly to a power grid of the building, and wherein in an event of power loss, the built-in battery backup ensures that the non-permissive fire connection system remains operational; and providing a fail-safe logic circuit in the non-permissive fire connection system, wherein the fail-safe logic circuit detects one or more of an error state or an error condition or a compromised condition of the non-permissive fire connection system, and defaults the electronic shut-off valve to a closed state.

2. The method of claim 1, further comprising transmitting an alarm message to a remote monitoring facility, and activating an audible and/or visual alarm, to alert building personnel and emergency responders of an attempted breach.

3. The method of claim 1, further comprising installing a second non-permissive fire connection device in a city water inlet line.

4. The method of claim 3, further comprising installing a third non-permissive fire connection device in the riser line downstream of a junction connecting the fire connection device line and the city water inlet line.

5. The system of claim 1, wherein the hydrocarbon detection sensor is a multi-modal sensor that integrates fiber-optic sensing, mid-infrared spectroscopy, and surface acoustic wave (SAW) detection within a single probe for real-time identification of the hydrocarbons in the flammable liquid.

6. A non-permissive fire connection system, wherein the non-permissive fire connection system comprises:

a hydrocarbon detection sensor and an electronic shut-off valve integrated in the non-permissive fire connection system;

said hydrocarbon detection sensor calibrated to detect a hydrocarbon in a hydrocarbon fuel that flows via a fire department connection line into a building;

said electronic shut-off valve configured to instantly respond to an electrical signal from the hydrocarbon detection sensor, wherein the electronic shut-off valve shuts off flow of the hydrocarbon fuel via the fire department connection line into a riser line and a sprinkler system, when the hydrocarbon detection sensor generates an electrical signal upon detecting the hydrocarbon in the fire department connection line, thereby precluding flow of the hydrocarbon fuel into the riser line and the sprinkler system of the building;

a hardwired power supply system with a built-in battery backup, wherein the non-permissive fire connection system connects directly to a power grid of the building, and wherein in an event of power loss, the built-in battery backup ensures that the non-permissive fire connection system remains operational; and a fail-safe logic circuit that detects one or more of an error state or an error condition or a compromised condition of the non-permissive fire connection system, and defaults the electronic shut-off valve to a closed state.

7. The non-permissive fire connection system of claim 6, wherein the non-permissive fire connection system is a tamper-proof internal instrumentation and valve system, and wherein the non-permissive fire connection system is installed in-line with the fire department connection line.

8. The system of claim 7, further comprising installing a second non-permissive fire connection system in a city water inlet line.

9. The non-permissive fire connection system of claim 8, further comprising installing a third non-permissive fire connection device in the riser line downstream of a junction connecting the fire connection device line and the city water inlet line.

10. The non-permissive fire connection system of claim 9, wherein an alarm message is transmitted to a remote monitoring facility, and an audible and/or visual alarm is activated, to alert building personnel and emergency responders of an attempted breach.

11. The non-permissive fire connection system of claim 6, wherein the non-permissive fire connection system is not accessible for manipulation from outside the building.

12. The non-permissive fire connection system of claim 6, wherein the hydrocarbon detection sensor is a multi-modal sensor that integrates fiber-optic sensing, mid-infrared spectroscopy, and surface acoustic wave (SAW) detection within a single probe for real-time identification of a hydrocarbon in the hydrocarbon fuel.

13. A non-permissive fire connection system, wherein the non-permissive fire connection system comprises:

a sensor assembly, a first electronic shut-off valve, a hydrocarbon detection sensor and a second electronic shut-off valve integrated within the non-permissive fire connection system, wherein the sensor assembly and the first electronic shut-off valve are installed upstream of the hydrocarbon detection sensor, such that a liquid entering a fire department connection line passes through the sensor assembly and the first electronic shut-off valve before reaching the hydrocarbon detection sensor;

wherein said sensor assembly is calibrated to detect physical properties comprising pressure, density, and viscosity of the liquid entering the fire department connection line, wherein said sensor assembly comprises a pressure sensor, a density sensor, and a viscosity sensor;

wherein said first electronic shut-off valve is configured to shut off flow of the liquid into the fire department connection line, when the incoming liquid flowing into the building is contaminated with a hydrocarbon;

said hydrocarbon detection sensor calibrated to detect the hydrocarbon that flows into a sprinkler system within a building via the fire department connection line and a riser line;

said second electronic shut-off valve configured to instantly respond to an electrical signal from the hydrocarbon detection sensor, wherein the second electronic shut-off valve shuts down flow of the incoming liquid into the fire department connection line, the riser line, and the sprinkler system, when the hydrocarbon detection sensor senses the hydrocarbon in the liquid flowing along the fire department connection line, thereby precluding flow of the hydrocarbon fuel into the riser line and the sprinkler system of the building;

a hardwired power supply system with a built-in battery backup, wherein the non-permissive fire connection system connects directly to a power grid of the building, and wherein in an event of power loss, the built-in battery backup ensures that the non-permissive fire connection system remains operational; and a fail-safe logic circuit that detects one or more of an error state or an error condition or a compromised condition of the non-permissive fire connection system, and defaults the electronic shut-off valve to a closed state.

* * * * *